(12) United States Patent
Byrne

(10) Patent No.: US 6,421,538 B1
(45) Date of Patent: Jul. 16, 2002

(54) MULTI-MODE RADIO TELEPHONE WITH VELOCITY SENSING MODE SELECTION

(75) Inventor: John Daniel Byrne, Shepperton (GB)

(73) Assignee: Nokia Mobile Phones, Limited, Salo (FI)

(*) Notice: Subject to any disclaimer, the term of this patent is extended or adjusted under 35 U.S.C. 154(b) by 0 days.

(21) Appl. No.: 08/359,904

(22) Filed: Dec. 20, 1994

(30) Foreign Application Priority Data

Dec. 22, 1993 (GB) .............................. 9326169

(51) Int. Cl.⁷ ................................. H04Q 7/20
(52) U.S. Cl. ..................................... 455/441
(58) Field of Search ................ 379/59, 60; 455/33.2

(56) References Cited

U.S. PATENT DOCUMENTS 4,989,230 A   1/1991   Gillig et al. ................. 379/59

FOREIGN PATENT DOCUMENTS

| EP | 0526 436 A1 | 2/1993 |
|---|---|---|
| GB | 2 240 696 A | 8/1991 |
| GB | 2240696 | 8/1991 |
| GB | 2242805 | 10/1991 |
| GB | 2 242 805 A | 10/1991 |
| GB | 2252699 | 8/1992 |
| GB | 2 252 699 A | 8/1992 |
| GB | 2262688 | 6/1993 |
| GB | 2269723 | 2/1994 |
| WO | WO 92/03006 | 2/1992 |
| WO | WO 92/12602 | 7/1992 |
| WO | WO 93/00777 A | 1/1993 |

*Primary Examiner*—William Cumming
(74) *Attorney, Agent, or Firm*—Perman & Green, LLP

(57) ABSTRACT

A radio telephone (200) is operable in a cordless telephone system or in a cellular telephone system. The telephone (200) incorporates circuitry to detect user velocity so that when the user travels more quickly the telephone automatically transfers from cordless mode, which is the preferred mode, to cellular mode. This prevents the degeneration in communication quality which frequently occurs when a user of a cordless system travels faster than walking pace.

13 Claims, 4 Drawing Sheets

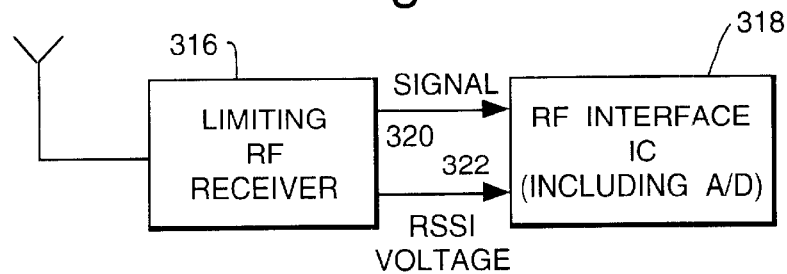
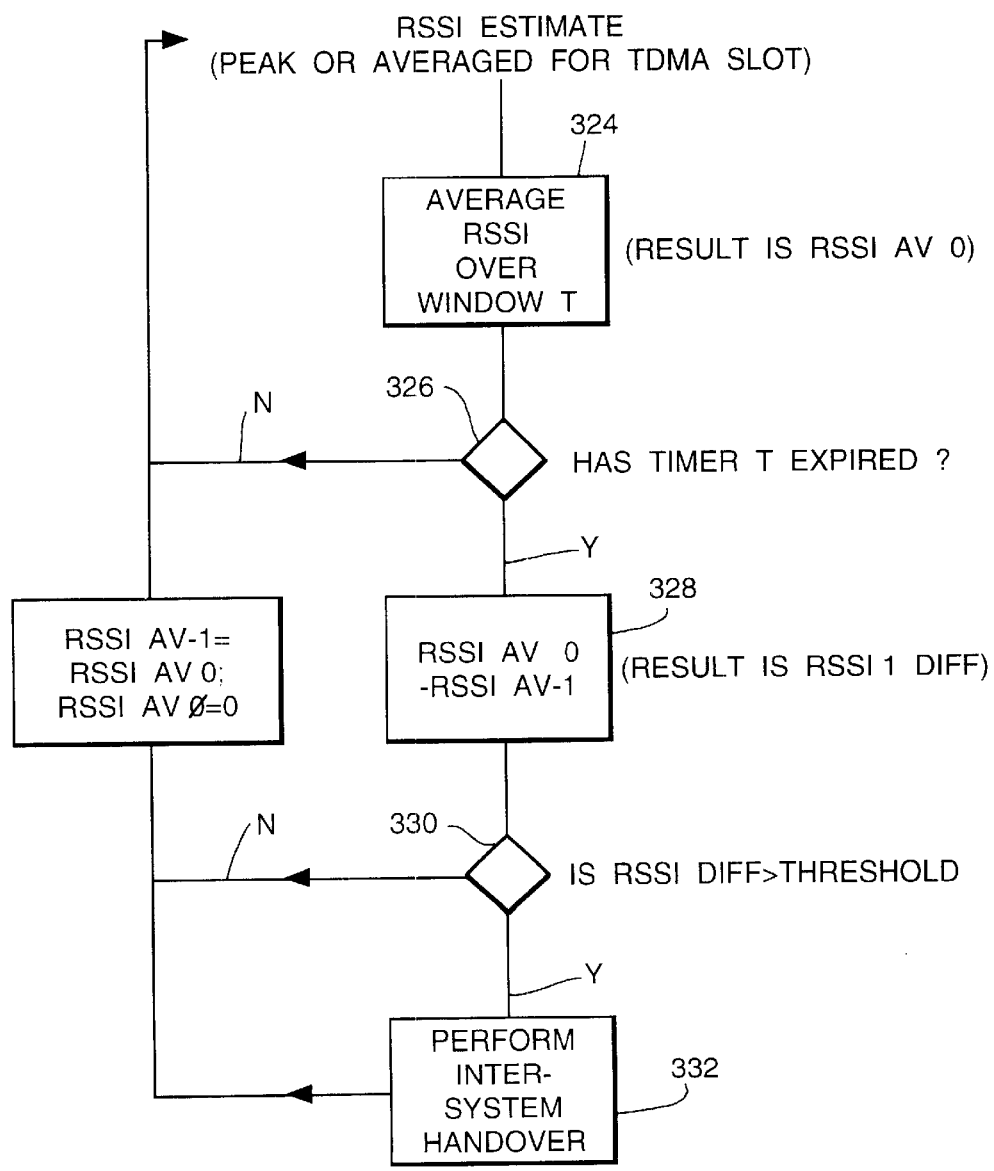

MULTI-MODE RADIO TELEPHONE WITH VELOCITY SENSING MODE SELECTION

FIELD OF THE INVENTION

The present invention relates to a radio telephone, and in particular to a radio telephone operable in more than one system and to a method of operating such a radio telephone.

BACKGROUND OF THE INVENTION

Over the last ten years there has been a rapid growth in the use and availability of radio telephone systems. As part of this growth there has been a proliferation of different types of radio telephone system, offering the user a variety of services, geographical coverage and cost. Many of these different radio telephone systems cover the same, or a part of the same, geographical area as each other.

Typically, different radio systems operate on different radio frequencies, utilise different modulation techniques, signalling techniques and intra-system protocols etc., to each other. Thus, a radio telephone designed for one system is generally unable to be used on another system. Thus if a user wishes to have access to more than one system it is necessary to have either more than one radio telephone or a radio telephone capable of operating in more than one system. Having more than one radio telephone is inconvenient for the user. Known radio telephones capable of operating in more than one system typically consist of little more than two separate telephones combined in a single housing. The preference for operating in a particular system is user defined as disclosed in U.S. Pat. No. 4,989,230.

A particularly useful and appropriate environment for multi-mode radio telephones is the recently available cellular and cordless telephone systems. In the prior art, cordless telephones are typically used in the home and office to allow the user to place and receive calls at any point throughout the house via an RF link with a home base station located within the house or office. Such cordless telephones are connected via the home base station to the user's telephone landline which is in turn connected to the Public Switched Telephone Network (PSTN). Further, there are known second generation cordless telephone systems such as CT-2 or DECT which are digital systems. Such CT-2 or DECT systems extend beyond conventional domestic operation of cordless telephones by allowing the user to establish an RF link between a CT-2 or DECT radio telephone and a base station in a more publicly accessible location, e.g. outside the user's home, a railway station, shopping mall or airport. Such base stations are known as telepoint base stations and are linked to the PSTN in much the same way as a home base station. Some cordless (and in particular DECT) radio telephones, are now able to receive calls via telepoint base stations whereas hitherto they were only able to place them. A description of such a system can be found in PCT International Patent Application WO 92/03006. Thus, placing and receiving calls whilst geographically roaming is possible in cordless telephone systems.

However, cordless telephone systems are generally low power systems and each base station provides telecommunications within only approximately a 150 meter radius of the base station, dependent upon the terrain and any man-made objects which could interfere with signalling between a cordless telephone handset and the base station. Such systems are generally only used in areas of high user density and thus tend to be limited to urban areas. This clearly restricts the geographical mobility of a CT-2, DECT or the like cordless telephone user.

In the prior art there are known so-called cellular radio telephone systems having base stations which cover a wide geographical area (cell), e.g. 35 km diameter. However, in urban areas where the user density is high the cells are much smaller and operate at lower powers to facilitate frequency re-use thereby increasing the communication channel density.

Cellular systems have advantages over cordless systems since they allow a user to place and receive calls over a large area. Additionally they are suitable for use in moving vehicles. This is because cellular telephone systems have sophisticated handover procedures to facilitate switching between cells as a user's vehicle crosses from one cell to another. This ensures continuity of service and is particularly important during a call. However, the cost of a cellular telephone call is significantly greater than the cost of a cordless telephone call, since cordless telephone calls are made by way of the user's land line PSTN link and cost the same as landline calls, whilst cellular telephone calls are made by way of expensive cellular base stations and cellular switching equipment and cost much more than land line telephone calls.

In order for a user to be able to utilise both cellular and cordless telephone systems via a single radio telephone handset a so-called cellular cordless telephone (CCT) has been proposed in U.S. Pat. No. 4,989,230.

Micro-cellular/cordless communication systems such as DECT are designed for users who are either static or moving at a walking speed. If the user of a mobile terminal (e.g. a transportable telephone or a portable handset) starts to move faster than these speeds, the communication quality is much reduced due to the following factors:

i) The terminal must perform a large number of handovers.

ii) Channel selection algorithms may operate at too slow a rate and communication outages and suboptimal channel selections occur.

iii) The user will very likely move quickly outside the micro-cellular coverage area.

As can be seen, due to the large number of handovers required, the activity of the network is also higher and so the network capacity is also reduced.

The invention aims to provide a multi-mode radio telephone, and a method of operation, in which user velocity is taken into account in automatic selection of telephone system.

BRIEF SUMMARY OF THE INVENTION

According to one aspect of the invention there is provided a radio telephone operative in at least two radio telephone systems, the radio telephone comprising communication means respectively associated with each of the radio telephone systems, sensing means for sensing the velocity of movement of the radio telephone and selection means responsive to the sensing means for selecting one of respective said communication means for the said telephone systems in dependence, wholly or partially, on the sensed velocity.

Preferably, the telephone systems are a micro-cellular telephone system and a macro-cellular telephone system respectively, the selection means selecting the micro-cellular system when the velocity is low and the macro-cellular system when the velocity is high.

In one embodiment, the sensing means are operative to sense velocity by sensing the rate at which the radio telephone moves across cell boundaries.

In another embodiment the sensing means are operative to sense velocity by sensing the Doppler shift (i.e. change of frequency) imparted to the signal received by the radio telephone as a consequence of the movement of the radio telephone. This method is probably most appropriate to systems using a large degree of digital signal processing which can calculate the main Doppler component quite accurately. The method selected must be careful not to mistake terminal/network frequency differences as Doppler shift.

In a further embodiment, the selection means are operative to determine the variation in strength of a signal received by the radio terminal, in order to sense user velocity.

The sensing means and the selection means may be incorporated in a mobile terminal (e.g. a transportable telephone or a portable handset) operative in the two systems, although it is possible for the sensing means and selection means to be incorporated in a base station or in a network associated with one or other telephone system. In this case the network may detect user velocity from the rate of change of location area or rate of handover. The network may then either command the terminal to change to the macro-cellular system or advise the terminal of its detected velocity, enabling the terminal to make the decision about system change over. In this latter case, the sensing means are in the network and the selection means in the telephone.

If a terminal is connected to some other device which is capable of measuring user velocity, this device can supply velocity information to the terminal. Examples of the types of device are: inertial navigation unit, satellite navigation system (GPS), local radio navigation system, car speedometer. This other device can be part of the terminal equipment or connected in some other way.

According to another aspect of the invention there is provided a method of operating a radio telephone operative in at least two radio telephone systems, comprising selecting a said radio telephone system in dependence, wholly or partially, on the velocity of movement of the radio telephone.

BRIEF DESCRIPTION OF THE DRAWINGS

FIGS. 4 and 5 show block diagrams of two alternative ways of detecting received signal strength intensity, and FIG. 6 is a block circuit diagram of a circuit showing how the rate of change of received signal strength intensity can be used to provide a measure of user velocity.

DETAILED DESCRIPTION OF EMBODIMENTS OF THE INVENTION

Specific embodiments of the invention will now be described, by way of example, with reference to the above described drawings.

Figure 1:
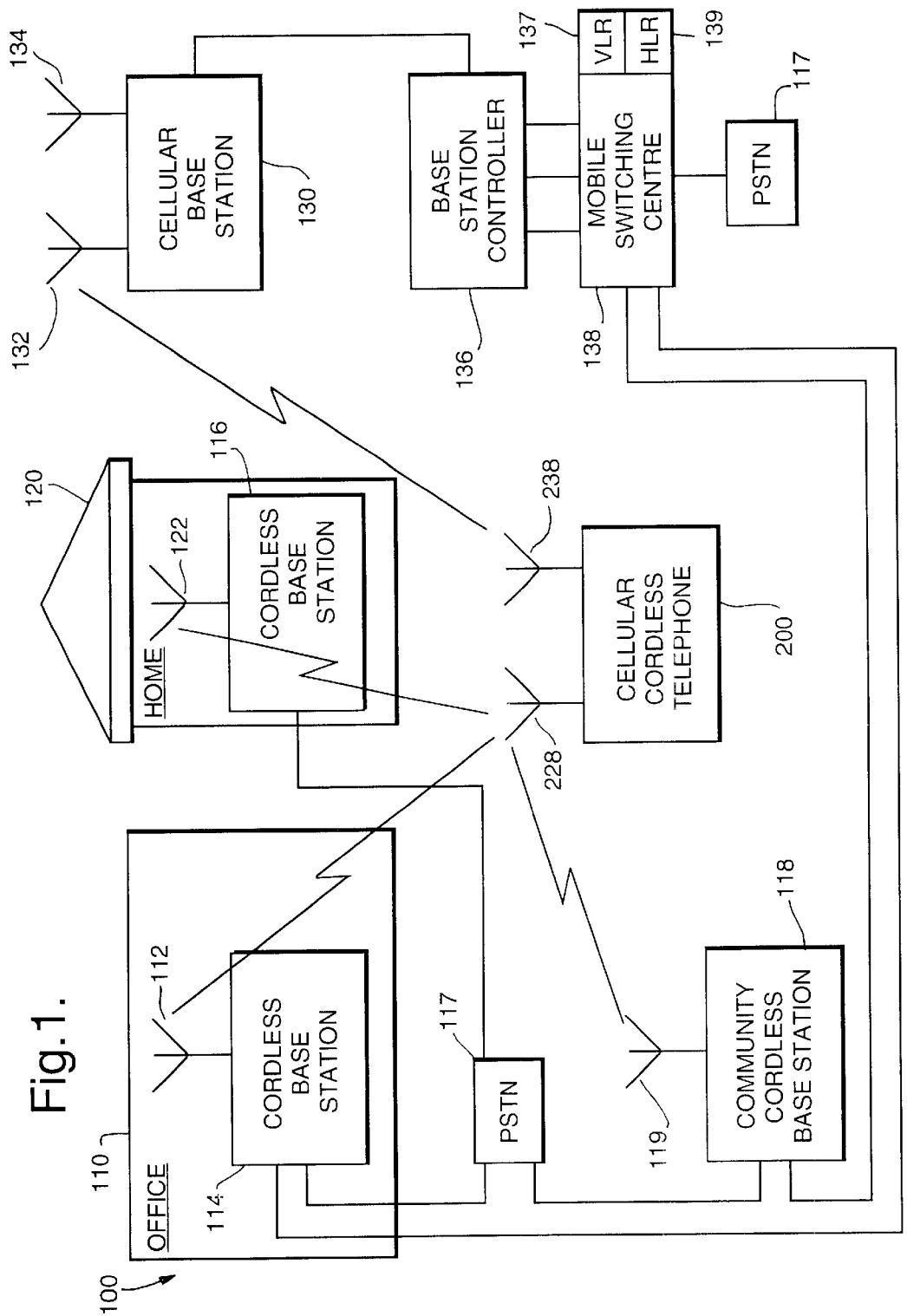
FIG. 1 is a block diagram of two telephone systems (one cellular and the other cordless) and a cellular cordless telephone according to the invention.

FIG. 1 illustrates a block diagram of cellular and cordless telephone systems 100 with either of which a cellular cordless telephone 200 can communicate. In practice there will be a plurality of telephones 200. The systems include a Public Switched Telephone Network (PSTN) 117, connected by landlines to cordless base stations 114, 116 and 118 having respective landline telephone numbers and respectively located in an office building 110, domestic residence 120 and some other geographical location.

The cordless base stations 114, 116 and 118 communicate with the cellular cordless telephone (CCT) 200 via respective antennas 112, 119 and 122. The antennas 112, 119 and 122 may be implemented as any sort of suitable antenna such as a whip antenna or (printed) helical antenna. The cordless base stations 114 and 116 may be conventional cordless base stations. A cordless base station 118 is a community cordless base station and such base stations may be located throughout an urban area, or common user area such as a railway station, shopping mall or airport, for providing a shared telephone service to CCTs 200. In such a case, the cordless base station 118 may include additional equipment not usually found in conventional cordless base stations for billing calls to a telephone number of the CCT 200.

Also connected through telephone landlines to the PSTN 117 is the mobile switching centre (MSC) 138 associated with Base station controller(s) (BSC) 136 for controlling a cellular base station(s) 130. The cellular base station 130 comprises both a receive antenna 132 and a transmit antenna 134 for communicating with CCTs 200.

Figure 2:
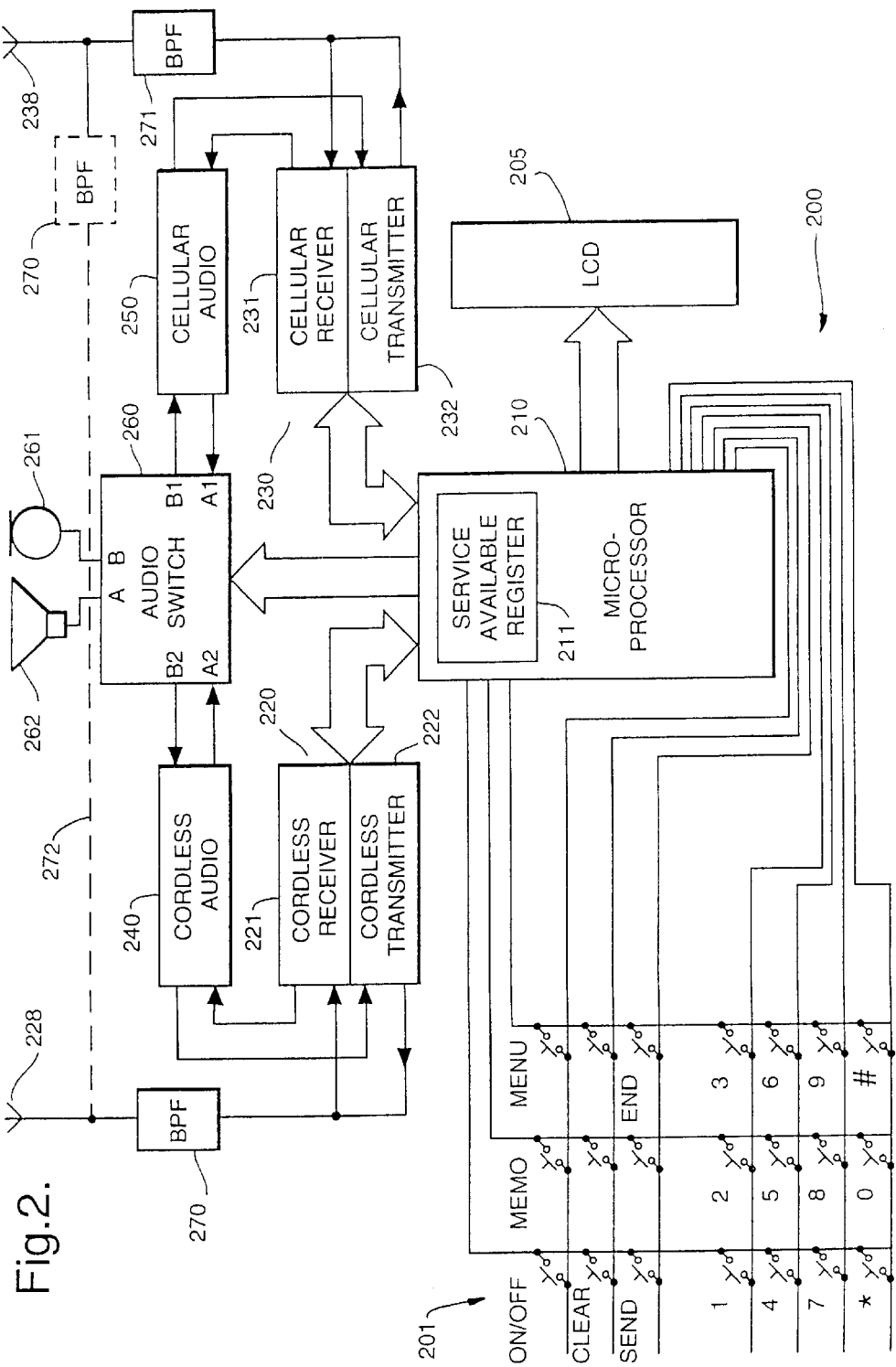
FIG. 2 is a block diagram of the cellular cordless telephone of FIG. 1.

The CCT 200 may be a mobile unit installed in a vehicle, a so called transportable unit, or a hand-held portable unit. The CCT 200 comprises an antenna 228 for cordless communication and an antenna 238 for cellular communication. The CCT 200 may alternatively comprise a single antenna 238 for both cellular and cordless communication and arranged as illustrated in FIG. 2 by the dotted line 272. Typically in the UK cordless telephone systems operate in frequency bands at 49 MHz (CTØ), 860 MHz (CT2) and 1880–1900 MHz (DECT) and cellular telephone systems in frequency bands 890–905 MHz and 935–950 MHz (TACS), 905–915 MHz and 950–960 MHz (GSM) or 1800 MHz (DCS).

FIG. 2 illustrates a detailed block diagram of an embodiment of a CCT 200 in accordance with the present invention. The CCT 200 comprises a cellular telephone transceiver 230 and antenna 238, a cordless telephone transceiver 220 and antenna 228, a microprocessor 210, keypad 201, display 205, audio switch 260, microphone 261 and speaker 262. The microphone 261, speaker 262 and keypad 201 may alternatively be located in a handset separate from the rest of the CCT 200. An alternative embodiment is shown by dashed line 272, in which cordless transceiver 220 and cellular transceiver 230 may be coupled to a single antenna 238 by way of band pass filter (BPF) 270 and a band pass filter (BPF) 271, respectively. The cordless telephone transceiver 220 may be any conventional cordless transceiver. However, it would be advantageous if the cordless telephone transceiver 220 conformed to a common air interface for cordless telephones, since this would facilitate roaming of the CCT 200 between different cordless systems. The cellular transceiver 230 may likewise be any conventional cellular transceiver. The keypad 201, microprocessor 210, display 205 and the like can be any available type, connected and arranged to operate in the CCT 200. The microprocessor 210 includes a Service Available Register (SAR) 221 for storing which radio systems are currently available to the CCT 200.

When operating as a cordless telephone control signals from the microprocessor 210 enable cordless receiver 221 and cordless transmitter 222. The microprocessor 210 also monitors signals from the cordless receiver 221, indicating received signal strength and for detecting receive data, and from the cordless transmitter 222 for sending transmit data. Additionally, the microprocessor 210 monitors control signals from the cordless transceiver 220 for detecting incoming calls (ringing), security codes and broadcast information relevant to the cordless system, and for sending dialling information.

The microprocessor 210 controls the CCT 200 in a similar way when operating as a cellular telephone, but appropriately modified for the signalling protocols and data encryption used in the cellular system. The signalling protocols, data encryption techniques and the like used in respective telephone systems, are well known in the art, and the microprocessor can be arranged to operate in a known manner to effect control of the signals in such systems.

The audio switch 260 is controlled by the microprocessor 210 to link the cordless audio channel 240 or the cellular audio channel 250 to the microphone 261 and loudspeaker 262 as appropriate.

In the present invention, user velocity is the criterion for selecting operation of the telephone 200 in either cellular or cordless mode. It will be appreciated that other criteria may additionally be used, the various criteria being accorded levels of importance or "weightings" dependent on the extent to which the criteria are to influence a final decision. These criteria and their weightings may be fixed or may be dynamically variable in dependence upon the performance of the telephone 200.

When the user moves, the telephone 200 will cross cell boundaries, and hence the rate of occurrence of handovers from one cell to an adjacent cell will be representative of user velocity.

Figure 3:
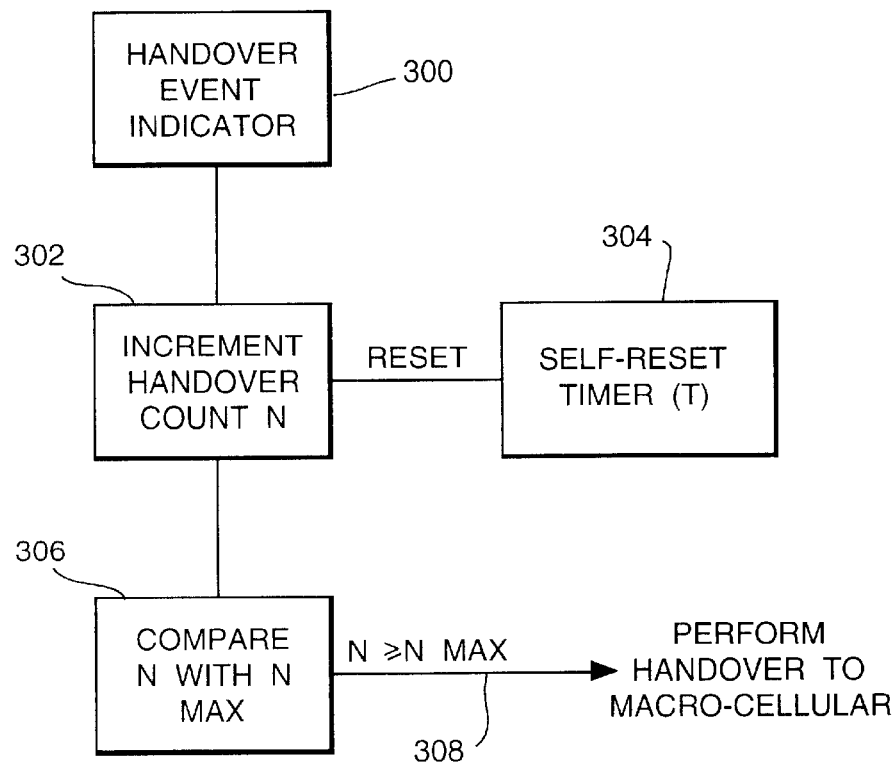
FIG. 3 is a block diagram illustrating an algorithm for determining user velocity from the number of handovers.

FIG. 3 shows in block diagram form the algorithm which is implemented in the microprocessor 210 to enable handover rate to be determined. A handover event detector 300 senses the occurrence of each handover or attempted handover. A counter 302 counts the number of handovers in a preselected time T, the counter 302 is being reset by a timer 304. The count accumulated in the counter 302 in the predetermined time T is compared, in a comparator 306, with a stored threshold count N max. If the count in the counter 302 exceeds N max, the comparator 306 produces a signal on output 308 which initiates transfer from the cordless mode to the cellular mode. Otherwise, cordless mode is maintained.

The circuit of FIG. 3 may be such that when the handover rate falls below a lower threshold, transfer to cordless mode is initiated.

Rate of change of received signal strength intensity (RSSI) can be used to detect user velocity. For this, the telephone 200 must first detect RSSI.

Figure 4:
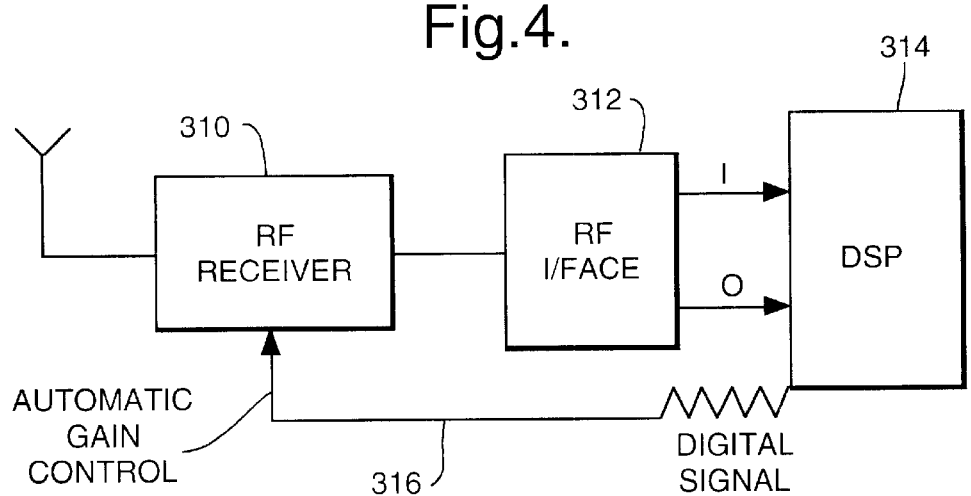

FIG. 4 shows one way of detecting RSSI using a linear receiver 310 which receives signals from the terminal antenna 228 or 238 and supplies signals to a radio frequency interface 312 which in turn supplies in phase (I) and quadrature phase (Q) signals to a digital signal processor 314. The digital signal processor 314 produces digital signals which are fed back by an automatic gain control feedback loop 316 to the receiver 310. A measure of RSSI is computed from a knowledge of the adjustable gain setting in the feedback loop 316 and from a calculation of power, corresponding to the sum of the squares of the in phase and quadrature signals, i.e $I^2+Q^2$.

Relating FIG. 4 to FIG. 2, the RF receiver 310 and RF interface 312 will be included in the cordless and cellular transceiver 220, 230 and the digital signal processor 314 will be included in the microprocessor 210.

FIG. 5 shows an alternative way of detecting RSSI using a non-linear receiver 316 which supplies to a radio frequency interface 318 a signal 320 representative of the signal received by the antenna and a second signal 322 representative of RSSI voltage. The RF interface 318 includes an analogue to digital converter and this is used to digitise the RSSI voltage from the limiting receiver.

Having obtained a signal representative of RSSI by FIG. 4 or FIG. 5, the rate of change of RSSI can be detected by a circuit adopted to operate in accordance with the flowchart shown in FIG. 6. A signal representative of the RSSI detection is fed to an averaging circuit at block 324 which averages the RSSI signal over a window of time T, producing the signal RSSI AV 0. The output from the averaging circuit obtained at block 324 is fed to a part of the circuit corresponding to decision block 326 which decides if the time T has expired. If it has not, branch N is taken and the system re-sets. If time T has expired, branch Y is taken and the RSSI AV 0 signal has subtracted from it, in a subtractor at block 328, the previous signal RSSI AV-1. The output of the subtractor at block 328 is a difference signal RSSI DIFF which is supplied to a circuit implementing decision block 330 which determines if RSSI DIFF is greater than a predetermined threshold. If it is not, branch N is taken and the system re-sets. If the decision taken at block 330 is YES system changeover is initiated, as indicated by block 332.

Thus, the described embodiment of the invention relies on user velocity to influence mode selection in a dual mode terminal.

The dual mode terminal consists of two modes:
i) Micro-cellular—useful whilst stationary and at walking pace.
ii) Macro-cellular—useful whilst stationary, walking and travelling at vehicular speeds.

Whilst in micro-cellular mode, if the user starts moving quickly the terminal selects the macro-cellular mode to prevent degradation of service. Furthermore calls on the micro-cellular system should not be initiated whilst travelling at speed.

This concept may be possibly widened from micro/macro cellular to a dual mode cellular/satellite system in airborne applications, in this case the satellite system becoming the macro system and the cellular the micro system.

What I claim is:

1. A radio telephone operative in at least two radio telephone systems, the radio telephone comprising communication means respectively associated with each of the radio telephone systems, at least one of the radio telephone systems being a cellular system and at least one of the radio telephone systems being a non-cellular system, sensing means for sensing the velocity of movement of the radio telephone, and selection means responsive to the sensing means for selecting one of respective said communication means for the said telephone systems in dependence, wholly or partially, on the sensed velocity,
   wherein the telephone systems include a micro-cellular telephone system and a macro-cellular telephone system, the selection means selecting the micro-cellular system when the velocity is low and selecting the macro-cellular system when the velocity is high, and
   wherein the telephone systems have networks with which the telephone communicates and at least one network has means for detecting radio telephone velocity and for transmitting information regarding said velocity to the radio telephone.

2. A radio telephone according to claim 1, wherein the sensing means are operative to sense velocity by sensing the rate at which the radio telephone moves across cell boundaries.

3. A radio telephone according to claim 2, wherein said rate is sensed by sensing the rate at which handover events, or attempted handover events, occur, a handover event being the transference of a radio telephone from one cell to an adjacent cell in the same telephone system.

4. A radio telephone according to claim 2, wherein the selection means comprise storage means having stored therein a threshold handover count, comparator means for comparing a prevailing handover count with the threshold count, the selection means being operative to initiate changeover from the micro-cellular system to the macro-cellular system if the prevailing count exceeds the threshold count.

5. A radio telephone according to claim 1, wherein the sensing means are operative to sense velocity by sensing the Doppler shift imparted to the signal received by the telephone as a consequence of the movement of the telephone.

6. A radio telephone according to claim 1, wherein the selection means are operative to determine the variation in strength of a signal received by the radio telephone, in order to sense user velocity.

7. A radio telephone according to claim 6, wherein the selection means determine the rate of change with time of the strength of the received signal, in order to sense user velocity.

8. A radio telephone according to claim 7, wherein the selection means comprise averaging means operative to determine average values of the received signal over successive predetermined time intervals, difference means operative to compare the averaged value with a preceding averaged value to determine a difference value, comparator means operative to compare the difference with a predetermined difference and to initiate transfer to the macro-cellular system if the prevailing difference value exceeds the predetermined difference value by more than a predetermined threshold.

9. A radio telephone operative in at least two radio telephone systems, the radio telephone comprising communication means respectively associated with each of the radio telephone systems, at least one of the radio telephone systems being a cellular system and at least one of the radio telephone systems being a non-cellular system, sensing means for sensing the velocity of movement of the radio telephone, and selection means responsive to the sensing means for selecting one of respective said communication means for the said telephone systems in dependence, wholly or partially, on the sensed velocity, wherein the telephone systems include a micro-cellular telephone system and a macro-cellular telephone system, the selection means selecting the micro-cellular system when the velocity is low and selecting the macro-cellular system when the velocity is high, wherein the selection means are operative to determine the variation in strength of a signal received by the radio telephone, in order to sense user velocity, wherein the selection means determine the rate of change with time of the strength of the received signal, in order to sense user velocity, and wherein the selection means comprise averaging means operative to determine average values of the received signal over successive predetermined time intervals, difference means operative to compare the averaged value with a preceding averaged value to determine a difference value, comparative means operative to compare the difference with a predetermined difference and to initiate transfer of the macro-cellular system it the prevailing difference value exceeds the predetermined difference value by more than a predetermined threshold.

10. A radio telephone according to claim 9, wherein the sensing means are operative to sense velocity by sensing the rate at which the radio telephone moves across cell boundaries.

11. A radio telephone according to claim 10, wherein said rate is sensed by sensing the rate at which handover events, or attempted handover events, occur, a handover event being the transference of a radio telephone from one cell to an adjacent cell in the same telephone system.

12. A radio telephone according to claim 10, wherein the selection means comprise storage means having stored therein a threshold handover count, comparator means for comparing a prevailing handover count with the threshold count, the selection means being operative to initiate changeover from the micro-cellular system to the macro-cellular system if the prevailing count exceeds the threshold count.

13. A radio telephone according to claim 9, wherein the sensing means are operative to sense velocity by sensing the Doppler shift imparted to the signal received by the telephone as a consequence of the movement of the telephone.

* * * * *